United States Patent
Fowell

(10) Patent No.: US 6,195,044 B1
(45) Date of Patent: Feb. 27, 2001

(54) LASER CROSSLINK SATELLITE ATTITUDE DETERMINATION SYSTEM AND METHOD

(75) Inventor: Richard A. Fowell, Culver City, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/100,303

(22) Filed: Jun. 19, 1998

(51) Int. Cl.[7] .............................. H04B 7/00; H04B 7/185; H04B 10/00
(52) U.S. Cl. ..................... 342/367; 342/355; 359/159; 359/172
(58) Field of Search .................. 342/355, 357.11, 342/358, 367; 244/171, 164; 359/172, 159; 356/139.03

(56) References Cited

U.S. PATENT DOCUMENTS

| | | | |
|---|---|---|---|
| 4,883,244 | 11/1989 | Challoner et al. | 244/171 |
| 5,119,225 | * 6/1992 | Grant et al. | 359/172 |
| 5,187,805 | * 2/1993 | Bertiger et al. | 455/12.1 |
| 5,592,320 | * 1/1997 | Wissinger | 359/159 |
| 5,959,576 | * 9/1999 | Ring | 342/357.11 |

OTHER PUBLICATIONS

Marshalek et al, "Lightweight Laser Communications Terminal for Low Earth Orbit Satellite Constellations", Feb. 1994, p. 200–217.*

Robert G. Marshalek and David L. Begley, Lightweight, high–data–rate laser communications terminal for low–Earth–orbit satellite constellations, Feb. 7–8, 1995, pp. 72–82.

Clark E. Cohen, et al, Space Flight Tests Of Attitude Determination Using GPS, Feb. 1994, pp. 427–433.

G. Sepp, Earth laser beacon sensor for earth–oriented geosynchronous satellites, Jul. 1975, pp. 1719–1726.

Robert G. Marshalek and David L. Begley, Lightweight laser communications terminal for low–Earth–orbit satellite constellations, Jan. 26–28, 1994, pp. 200–217.

Morris Katzman, Laser Satellite Communications, 1987, pp. 190–213.

K. Yong, et al, Autonomous Navigation For Satellites Using Lasercom Systems, Jan. 10–13, 1983.

Robert O. Wales, ATS–6 Final Engineering Performance Report, vol. II—Orbit and Attitude Controls, 1981, pp. 66 & 86.

Dr. Franklin W. Floyd, et al, Flight Performance Of The LES–8/9 Three–Axis Attitude Control System, 1980, pp. 159–170.

T. Aruga, T. Igarashi, Three–Axes Atitude Determination Of Spacecraft Using A Laser, Sep. 1977, pp. 473–479.

* cited by examiner

Primary Examiner—Gregory C. Issing
(74) Attorney, Agent, or Firm—T. Gudmestad

(57) ABSTRACT

A laser crosslink attitude determination system using the payload laser crosslinks as the principal attitude sensor and thereby eliminating the need for additional high-cost, high performance dedicated celestial body or inertial sensors to provide attitude information. The method and system establishes optical crosslinks among orbiting spacecraft for attitude control by performing a series of deterministic scans. The need for separate dedicated attitude sensors is minimized or eliminated by increasing the acquisition field of uncertainty and/or reducing the crosslink acquisition field of view.

7 Claims, 2 Drawing Sheets

LASER CROSSLINK SATELLITE ATTITUDE DETERMINATION SYSTEM AND METHOD

TECHNICAL FIELD

The invention relates generally to spacecraft attitude determination and control systems, and more particularly to attitude control of a spacecraft orbiting a celestial body using laser crosslinks between the spacecraft and other spacecraft.

BACKGROUND ART

Presently there are many different types of attitude sensors employed by spacecraft to determine attitude. Star trackers, sun sensors, earth sensors and gyroscopes are common. The required accuracy of such attitude sensors is usually determined by the required pointing accuracy of the payload. Laser crosslink payloads typically require highly accurate pointing accuracy. The cost of such attitude sensors generally increases with the sensor accuracy. Thus, in a constellation of satellites, use of high performance dedicated attitude sensors on each satellite represents a significant portion of the overall constellation expense.

Prior art techniques for satellites with optical crosslink payloads have typically assumed that the crosslinks are initially acquired and closed by equipping the satellite with attitude sensors of high enough accuracy such that the uncertainty in the pointing angles of the crosslink to the target satellite (the "field of uncertainty", or FOU) is smaller than the acquisition field of view (FOV) of the crosslink receive telescope or the FOV of the crosslink acquisition transmit beam. Calculated acquisition times, or crosslink closure times, for such systems are typically less than three minutes, and frequently on the order of a few seconds.

These high performance features of prior art systems are not otherwise needed during the mission since, once the crosslinks are closed, the crosslinks themselves provide extremely accurate attitude data that can be used to maintain the crosslinks and perform crosslink handoffs as needed.

SUMMARY OF THE INVENTION

In the present invention, the aforementioned drawbacks of prior systems are solved by increasing the acquisition FOU and/or reducing the crosslink acquisition. In order to achieve rapid acquisition and closure times, such systems typically require an acquisition transmit/receive FOV that is much larger than the typical operational transmit/receive FOV of less than 100 arcseconds. To initially acquire and close crosslinks in a matter of minutes or seconds, such systems also require an attitude determination uncertainty that is much less than can be readily achieved by such low cost attitude sensors as magnetometers or GPS attitude determination systems. Both of these factors—the magnitude of the discrepancy between laser terminal acquisition FOV and service FOV, and the increased accuracy of the attitude determination sensors required to provide the laser crosslink acquisition FOU above that required for spacecraft health and safety—represent considerable cost. Additionally, these high performance elements that provide a low acquisition FOU and a high acquisition FOV are used primarily to initially acquire FOV. The disclosed method of using laser crosslinks for attitude control provides accurate, responsive angle sensing that enables full and continuous attitude determination without the need for a multiplicity of separate dedicated celestial body or inertial sensors. The laser crosslink attitude determination system of the present invention uses the payload laser crosslinks as the principal attitude sensor and eliminates the need for additional high-cost, high performance sensors such as star sensors to provide attitude information.

Crosslinks between satellites are acquired by defocusing their respective transmit beams to broaden the beams while maintaining the detectable illumination intensity, and scanning the beams over the acquisition FOU which is larger than either the transmit or receive FOV of the respective satellites. Upon successive deterministic scans, one satellite's transmit beam will illuminate the other satellite's receiver telescope FOV. The illuminated satellite then uses its receiver telescope measurements to guide its transmit beam to point toward the detected direction of illumination. Once both satellites are linked by the broad transmit beams, the direction information is used to start another iteration with narrowed beams, until the satellites are linked with an operational beam width.

Accordingly, an object of the present invention is to provide an improved attitude control system utilizing laser crosslinks between orbiting satellites.

Another object of the present invention is to provide attitude control for a satellite without the need for separate dedicated celestial body or inertial sensors.

A further object of the present invention is to use a single low performance attitude sensor and gyroscope for initial acquisition. Thereafter, once a crosslink has been established between two satellites, the attitude sensor and gyroscope can be powered off, thereby saving power, reducing thermal dissipation and improving reliability.

Another object of the current invention is to reduce system costs by increasing the crosslink acquisition FOU and/or reducing the crosslink acquisition FOV relative to prior-art systems, and subsequently using laser crosslink pointing information for attitude data.

An advantage of the present invention is that established crosslinks can be used to calibrate both fixed and periodic errors in the alignments between a satellite's base body attitude sensors and its crosslink terminals, and between multiple crosslink terminals on the satellite. This improves the accuracy of crosslink orientation predictions based on body attitude sensor data, thereby reducing later reacquisition time and improving attitude determination accuracy.

Another advantage of the present invention is that crosslinks can be acquired between satellites even when the satellites are not in the service orbit. For example, crosslinks can be established during ion propulsion ascent of the satellites.

A further advantage of the present invention is that it allows crosslinks to be acquired when a satellite is not in its service attitude.

Other objects and advantages of the invention will become apparent upon reading the following detailed description and appended claims, and upon reference to the accompanying drawings.

BRIEF DESCRIPTION OF THE DRAWINGS

For a more complete understanding of this invention reference should now be had to the embodiment illustrated in greater detail in the accompanying drawings and described below by way of example of the invention.

BEST MODES FOR CARRYING OUT THE INVENTION

Figure 1:
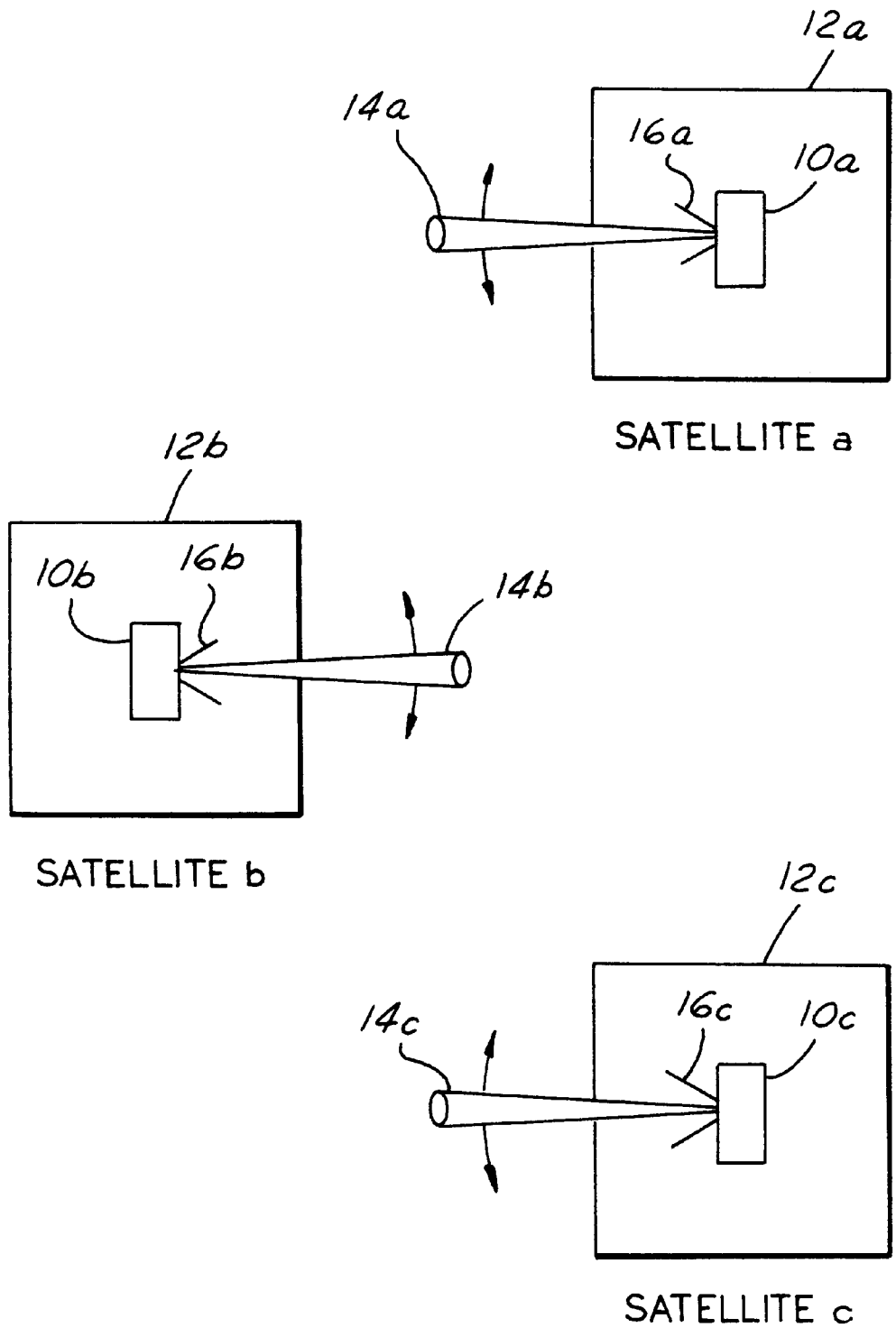
FIG. 1 is a schematic view of three spacecraft acquiring optical crosslinks according to the present invention.

In the following detailed description, spatially orienting terms may be used such as "left," "right," "vertical," "horizontal," and the like. It is to be understood that these terms are used only for convenience of description of the preferred embodiments by reference to the drawings. These terms do not necessarily describe the absolute location in space, such as left, right, upward, downward, etc., that any element or member must assume.

While the invention will be described in connection with a preferred embodiment, it will be understood that the invention is not limited to that embodiment. Rather, the invention covers all alternatives, modifications and equivalents as may be included within the spirit and scope of the invention as defined by the appended claims.

The fundamental principle behind attitude determination according to the present invention is that the relationship between two coordinate frames can be described by a direction cosine matrix. Once a link is established between two satellites, data regarding host and target spacecraft ephemeris in addition to information from at least two onboard laser terminals can be used to readily generate the direction cosine matrix which determines spacecraft attitude. The determination of the satellite three-axis attitude based on such information is known in the art as "Wahba's problem." There are many well-known algorithms for finding the satellite attitude based on this data, such as TRIAD, QUEST and FOAM.

The primary concern for attitude determination using crosslinks is the issue of initially acquiring crosslinks to begin attitude determination. The present invention discloses a method for closing optical crosslinks between satellites without the need for separate high performance dedicated sensors typically relied upon for attitude determination.

There are three cases to consider in closing a link between two satellites which are not already directly linked.

(1) Neither satellite has an established crosslink to any other satellite (such as during constellation initialization)

(2) One satellite has an established crosslinks to at least two other satellites (such as during constellation replenishment or reacquisition), and (3) Both satellites have established crosslinks to at least two other satellites (such as during normal operation).

In the last case, where both satellites have established crosslinks, both the satellite attitude and the alignments of the optical crosslinks and satellite attitude sensors are known by processing crosslink gimbal feedback data and satellite ephemerides. With this information, acquiring new crosslinks is rapid and well understood. To acquire a new crosslink, each satellite can point its receive telescope so that the target satellite is in the receiver telescope field of view (FOV). This requires that both satellites know their own attitude, crosslink mounting alignments and the direction to the target satellite accurately. The crosslinks are acquired by defocusing the transmit beams to broaden the beams yet maintain the beam within the detectable illumination intensity. The beams are then directed toward the respective receiver's FOV. When one satellite illuminates the other, the illuminated satellite uses its receive telescope measurements to guide its transmit beam to point toward the detected direction of illumination. Once both satellites are linked by the broad transmit beams, the direction information is used to start another iteration with narrowed beams, until the satellites are linked with the operational beam width.

For cases (1) and (2), in which there is a large field of uncertainty (FOU), one or both of the satellites will not have the benefit of on-orbit calibrated alignments and crosslink attitude data. In the past, additional dedicated high performance attitude sensors or wide FOV laser crosslinks were required to aid in acquiring crosslinks between such satellites. As described above, use of such high performance sensors allowed crosslinks to be acquired in a matter of minutes or seconds, but significantly increased the cost of each satellite within a constellation. Using the present method, it has been shown that such dedicated high performance sensors are not necessary to acquire crosslinks.

For example, assuming the following typical acquisition parameters, the crosslink acquisition method of the present invention can be used to establish crosslinks between satellites without the need for additional dedicated high performance attitude sensors. In this example, the FOU is at least five times greater than the crosslink transmit/receive FOV:

Crosslink Acquisition Parameters:
(1) crosslink acquisition angular range=0.08 degree radius
(2) crosslink receive telescope field of view=0.10 degree radius
(4) crosslink acquisition time if both satellites are in the each other's receive telescope field of view is<1 minute.

In this example, the FOU is at least five times greater than the crosslink transmit/receive FOV.

Satellites without highly accurate dedicated attitude sensors that do not have any closed crosslinks will have a greater target uncertainty error (perhaps as great as 0.5 degrees radial) due to the uncertain attitude of the base body and the uncertain alignment between the base body and the laser crosslink terminals. Thus, any one minute acquisition attempt may fail because one or the other satellite may not be in the FOV of the other satellite's receiver telescope. In accordance with the present invention, the satellites make repeated attempts to acquire a crosslink. Each satellite points its receive telescope in different overlapping directions until a crosslink is acquired. Since a successful acquisition requires that both satellites choose a pointing direction that places the target in the receive telescope FOV, the number of required attempts grows rapidly with pointing uncertainty. Also, once the number of attempts becomes high, the fact that many of the attitude determination errors vary with time means that the relationship between the current acquisition attempt direction and previous attempt directions are not known with certainty.

Because the disclosed system and method allows for greater initial pointing uncertainty and resulting FOU than prior art systems, initial crosslink acquisition times will typically be greater than several minutes. The crosslink acquisition times for the present system can be estimated based on a probabilistic model. In a deterministic model, once a pair of directions (one for each satellite) is searched, it can be eliminated, and the total number of attempts is the product of the uncertainty angular area for each satellite divided by the capture angular area for each satellite, multiplied by a fill efficiency factor (assume 1.21 for a hexagonal overlapping search pattern). The uncertainty area is the ratio of the attitude uncertainty divided by the acquisition range in each of two axes, multiplied. In this case, the ratio 0.5 deg/0.08 deg=6.25, for each axis that is not perpendicular to a closed crosslink. Because a search is not continuous for all time periods, however, the crosslink acquisition time estimates assume that only 50% of long periods have 0.5 degree accuracy about a single crosslink, and that attitude uncertainty doubles, otherwise. The estimated link closure times for crosslinks established according to the present invention are given in Table 1. In Table 1, it is assumed that each acquisition attempt has a probability of success that is the reciprocal of the number of deterministic acquisition attempts.

TABLE 1

| Satellite A closed links | Satellite B closed links | Deterministic acquisition attempts | 50% Probable acquisition time | 90% Probable acquisition time | 99% Probable acquisition time |
|---|---|---|---|---|---|
| 0 | 0 | $1.21 * 6.25^4$ | 44 hours | 6 days | 12 days |
| 1 | 0 | $1.21 * 6.25^3$ | 8 hours | 1 day | 2 days |
| 2 | 0 | $1.21 * 6.25^2$ | 95 min | 4 hours | 8 hours |
| 2 | 1 | $1.21 * 6.25$ | 11 min | 35 min | 70 min |
| 2 | 2 | 1.0 | <1 min | <1 min | <1 min |

Although, as seen in Table 1, the first crosslink could take approximately 12 days, in practice a link can be established in less time. For example, a constellation of satellites is typically deployed over a period of several weeks. If a first launch places four or more satellites into adjacent positions in the same plane, there will be at least three attempted acquisitions occurring simultaneously as each satellite searches for its neighbors. Accordingly, with three simultaneous attempts, a first link will occur within 4 days with 99% certainty; a second link will occur within 2 additional days with 99% certainty, and the last crosslink will be established within 2 additional days with 99% certainty. Thus, a starting group of four satellites would be fully linked in less than 10 days with 99% certainty. Later launched satellites would be able to easily acquire links to the first group, as shown in the third and fourth rows of Table 1. Therefore, subsequent constellation buildup would be rapid.

The amount of time to relink in the event of total attitude information loss for a single satellite in a linked constellation, or when introducing a new satellite to a constellation, is also the time required to sequentially complete the operations shown in the third and fourth rows of Table 1. Acquisition time can be further reduced, however, if the satellite attempts to acquire several of its neighboring satellites in parallel. Simply trying to acquire both the "leader" and "trailer" satellites simultaneously reduces the 90% probable time to first link to two hours.

Links can also be made in accordance with the present invention during ion ascent of a group of satellites. Ion ascent typically lasts a period of weeks, and a given launch typically lofts multiple satellites. While the satellites ascend in the same orbit plane and separate into their service separation, links can be established between adjacent satellites which would otherwise be linked once in the service orbit.

Acquisition time can also be reduced for satellites not yet in service by placing the satellite in an attitude more favorable for crosslink acquisition, rather than in a service attitude. Laser crosslink acquisition is generally not inhibited by a fixed attitude error resulting from a rotation about the line to a target satellite. Thus, crosslink acquisition is primarily related to azimuth and elevation. Poor attitude knowledge about the line of sight to the target satellite is relatively unimportant. By not specifying the same attitude accuracy in all three axes, acquisition time can be improved because attitude control sensors typically have accurate pointing knowledge that is different in different directions in both the body and in inertial space. For example, sensors often have better accuracy when their reference is close to the center of the field of view. Sensors also typically have good attitude accuracy for rotations perpendicular to the line of sight to the target, but little or no attitude information about the line to the sensor target. Thus, acquisition time can be improved by maintaining the satellite in an attitude that maximizes crosslink acquisition probability.

As another example, assume a satellite is in an orbit where it is to be linked to two adjacent satellites in the same orbit plane, and the lines to both the leading neighbor and the trailing neighbor are 20 degrees below local horizontal. Further assume the satellite has a single star sensor with a FOV with 10 degree radius. A preferred implementation is to place the star sensor with its FOV central axis along local horizontal, and in the orbit plane, so that its FOV central axis is 20 degrees from the two desired crosslink directions. The attitude information from the star sensor is reliable for rotations perpendicular to its FOV central axis direction, but relatively poor for rotations about the FOV central axis direction. Since the desired crosslink directions are relatively close to the FOV central axis direction, however, the uncertainty of orientation about the FOV central axis direction couples into uncertainty in the crosslink target direction by the attenuating factor of sine (20 degrees), improving the utility of the star sensor information in initiating the link. This allows the use of a reduced accuracy star sensor from that required if the star sensor FOV were, for example, pointed in an antinadir direction. While this could be improved further by aligning the star sensor FOV central axis direction with one of the nominal crosslink directions, this improvement in closing the first link would detract from the ability to close the second link. These two goals should be appropriately weighted in selecting the star sensor alignment.

When trying to close the second link, the angle between the closed crosslink and the star sensor FOV central axis allows the precise cross-axis information from the closed crosslink and the star sensor to compensate for the weak information about these axes, reducing the uncertainty of the direction to the second crosslink target.

An alternative embodiment for linking a constellation of satellites is to equip one or two of the satellites in the constellation with better body attitude determination than the other satellites. This could be accomplished with a single star sensor. These "pathfinder" satellites will know their attitude well and can, therefore, illuminate their unlinked "lost" neighbors until the neighboring satellites find the pathfinder satellite with their receiver telescopes. A single pathfinder satellite greatly reduces the initial linkage time of the satellites in cases where the acquisition FOU and resulting acquisition time are unacceptable because none of the satellites have good attitude knowledge.

A pathfinder satellite is useful to speed up the initial acquisition process when none of the satellites know their attitude. For later reacquisitions, however, most satellites in the constellation will have better attitude knowledge as a result of previously established crosslinks than a single unlinked pathfinder satellite. Adding attitude determination sensors to one or two satellites to create pathfinder satellites in a constellation of dozens of satellites would represent a relatively small increase in cost per satellite.

Referring now to the drawings, FIG. 1 shows three unlinked satellites 10a, 10b, 10c deployed in the same orbit plane. For example, satellites 10a, 10b, 10c can be low earth orbit communications satellites at an altitude of 1400 km, wherein satellites 10a, 10c are in the same orbit plane as satellite 10b. Furthermore, satellites 10a, 10c are ahead and behind, respectively, satellite 10b such that satellites 10a, 10c are 20 degrees below local horizontal with respect to satellite 10b. Each satellite 10a, 10b, 10c contains a computer for estimating its location. The location of each satellite 10a, 10b, 10c is estimated by using as inputs the respective satellite ephemerides, the attitude of the respective satellite with respect to a reference frame, and information regarding the relationship between the crosslink frame of reference and the satellite body frame of reference.

The uncertainty associated with the knowledge of the location (position in orbit) of each satellite and the attitude of its transmit beam line of sight relative to that location forms an acquisition error volume or Field of Uncertainty (FOU) 12a, 12b, 12c for each satellite 10a, 10b, 10c. The size of the FOU 12a, 12b, 12c is generally dominated by the attitude uncertainty of the satellite, and to a lesser extent by the uncertainty in the alignment of the crosslink FOV to the satellite and the uncertainty of the satellite location, both of which must be referenced to the transmitter and receiver telescope of each satellite 10a, 10b, 10c.

Because the satellites 10a, 10b, 10c of the present system are not equipped with high performance attitude sensors such as star trackers, sun sensors or earth sensors, the satellites 10a, 10b, 10c will initially have poor attitude and location information. This lack of attitude and location information results in a FOU 12a, 12b, 12c that is larger than the transmit beam FOV 14a, 14b, 14c or the receiver FOV 16a, 16b, 16c.

To establish links between the satellites 10a, 10b, 10c, each satellite 10a, 10b, 10c scans its respective FOU 12a, 121b, 12c with a broadened transmit beam 14a, 14b, 14c that is detectable at range by the receiver of the other satellites. A smooth scan approach can be used to scan the respective transmit beams 14a, 14b, 14c. A smooth scan has benefits over a step/stare approach of minimizing the strain on the gimbal components and reducing base motion disturbances by the scan. Spiral or rectangular scan patterns are alternatives having the desirable attributes of minimum acquisition time and reduced base motion generation.

At the same time, the receiver telescopes of the respective satellites 10a, 10b, 10c are scanned over the respective fields of uncertainty 12a, 12b, 12c. When the receiver telescope of, for example, satellite 10a detects the transmit beam 14b of satellite 10b, satellite 10a will return its transmit beam 14a toward the estimated location of the detected beam of satellite 10b. Satellite 10b continues scanning awaiting the return transmit beam 14a of satellite 10a. When the receiver telescope of satellite 10b detects the transmit beam 14a of satellite 10a, it stops scanning, and illuminates the receiver telescope of satellite 10a with its transmit beam 14b. The receiver telescope of satellite 10a detects the transmit beam 14b of satellite 10b and locks onto it. Mutual acquisition is completed, and each satellite can then hand off the acquisition to fine tracking and operational communications. The information from the gimbal angles of the locked crosslink can now be used for attitude determination and to aid the closure of the remaining unlinked crosslinks.

Figure 2:
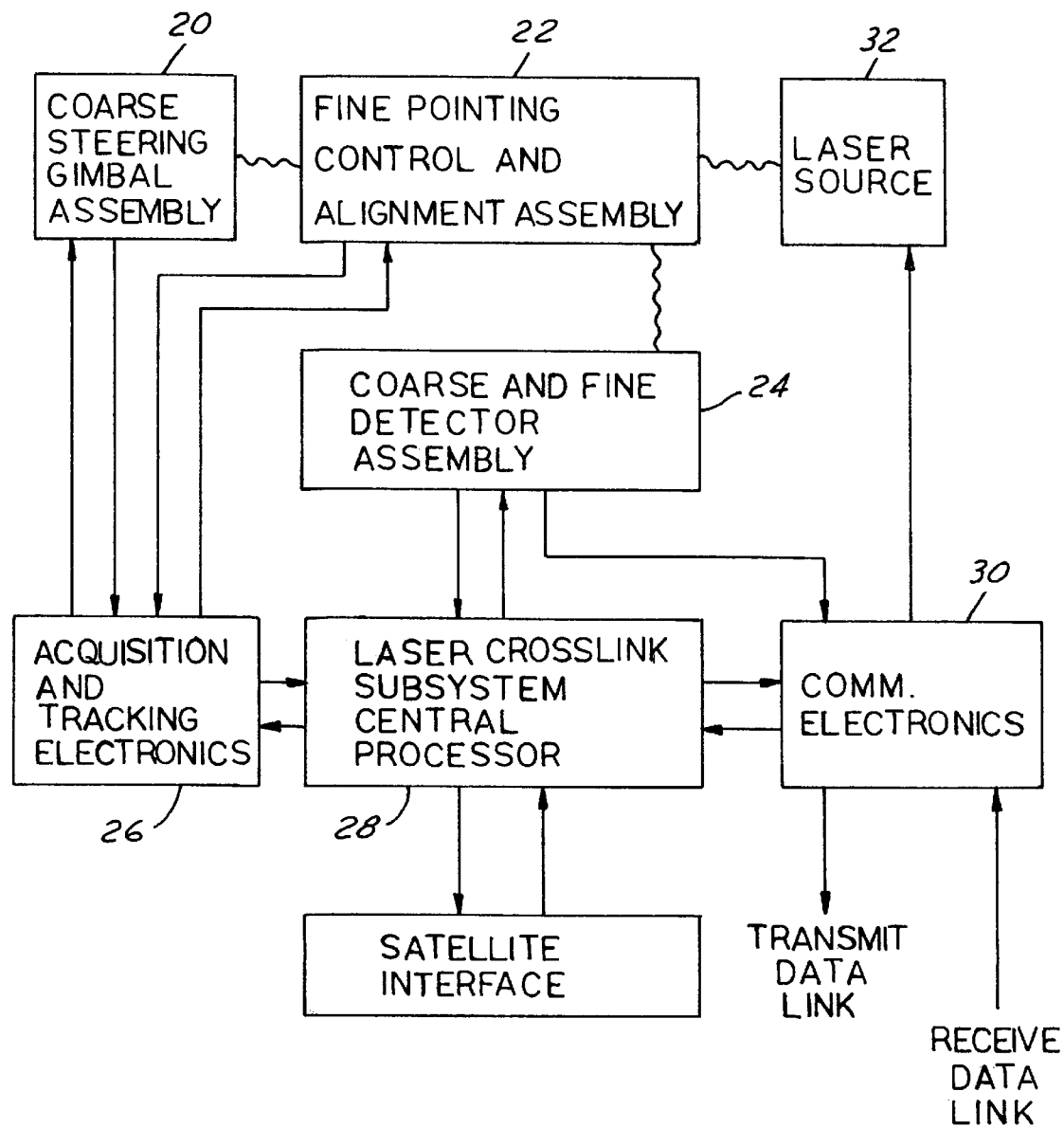
FIG. 2 is a functional block diagram of the laser crosslink attitude determination system according to the present invention.

A functional block diagram of the laser crosslink attitude determination system of the present invention is shown in FIG. 2. The major subsystems include a coarse steering gimbal assembly 20, fine pointing control and alignment assembly 22, coarse and fine tracking detector assembly 24, acquisition and tracking electronics assembly 26, the laser crosslink subsystem central processor 28, communication electronics 30, and the laser source 32.

During acquisition, the coarse steering gimbal assembly 20 receives open loop gimbal angle commands from the acquisition and tracking electronics 26 to steer a received transmit beam into the receiver telescope's FOV. The fine pointing control and alignment assembly 22 performs the critical pointing function of the optical crosslink system. Once a crosslink is acquired, fine pointing is accomplished in a closed-loop method by using error signals from the fine tracking detector 24. The coarse and fine tracking detector assembly 24 consists of an acquisition coarse detector, a fine tracking detector, and a data processor and its associated electronics.

The acquisition and tracking electronics assembly 26 performs the functions of acquisition, reacquisition, tracking and pointing. Data provided from by the central processor 28 and the coarse and fine tracking detector assembly 24 is processed to drive the coarse steering gimbal assembly 20 and fine pointing and alignment assembly 22 to perform open-loop acquisition and closed-loop tracking, alignment, and calibration of the entire attitude determination system.

The acquisition and tracking electronic assembly 26, the coarse steering gimbal assembly 20, the fine pointing control and alignment assembly 22, the coarse and fine detector assembly 24 and the central processor 28 operate together to form two, 2-axis servo loops which are used for the acquisition, pointing and tracking of another satellite's terminal. The inner loop, Fine Pointing Assembly (FPA) is used to attenuate base mount disturbances, but because of its limited field of travel and fine detector FOV, an outer loop Coarse Pointing Assembly (CPA) is required to keep the FPA operating about a variable null caused by changes in orbit position of the satellite. The CPA uses an exemplary gimbal with a travel range of +/−125 degrees azimuth, 0 to −17 degrees elevation to track the target satellite as they both move through their orbits. The FPA, contains a fast steering mirror which provides high precision line of sight pointing and high frequency disturbance rejection capability.

For the laser crosslink to acquire the target satellite's acquisition signal, the CPA must position the terminal so that its line of sight is pointed toward the target satellite. A Kalman filter estimates the gimbal angles required for the CPA and provides this information to the receiver telescope controller. The fast steering mirror of the FPA performs a predefined search algorithm and acquires the acquisition signal. Once the signal is acquired, the CPA updates the gimbal position to maintain the fast steering mirror at its center of travel and tracking will begin.

During payload communications operation, the detected laser beam is measured for signal power and orientation off boresight. An error signal is generated based upon these measurements. The FPA receives this error signal and positions the fast steering mirror to null the error and maximize received signal strength. The FPA has limited travel range which requires the CPA servo control to be slaved to the FPA servo control to ensure that the fast steering mirror does not exceed its allowable travel range. Point ahead travel angles for the transmitted laser beam are also determined based upon the spacecraft ephemeris and attitude.

While in operation, the CPA is slaved to the FPA to ensure that the fast mirror stays within its travel range while tracking. Therefore, the spacecraft control system is not driving the gimbal controllers. However, the attitude determination system is using this information to calculate spacecraft attitude. The gimbal, azimuth and elevation angles are summed with the associated point ahead angles to determine the true line of sight vector to the target satellite. The point ahead angles are used to account for the effects of time delays and spacecraft motion. These angles vary depending on the distance and relative orbit location of the target spacecraft. The sensor line of sight vector is then transformed into the body frame, and the line of sight vector is corrected for any misalignments, diurnal and seasonal alignment variations. The ephemeris information for the spacecraft and the target is used to find the line of sight vector in the Earth Centered Inertial (ECI) reference frame. These two vectors are used to calculate the satellite body ECI transformation matrix. The Kalman filter provides a predicted body ECI matrix which helps eliminate measurement noise and other high frequency effects. The Kalman filter also estimates the alignment biases and updates the alignment bias terms. The primary information provided by the Kalman filter is the spacecraft body position and rates. This information is communicated to the spacecraft control system which positions the spacecraft accordingly.

While the invention will be described in connection with one or more embodiments, it will be understood that the invention is not limited to those embodiments. On the contrary, the invention includes all alternatives, modifications, and equivalents as may be included within the spirit and scope of the appended claims.

What is claimed is:

1. A method of optically crosslinking two unlinked satellites for attitude determination and control comprising the steps of:

estimating the location of the first and second satellites;

transmitting a beam of coherent energy from the first satellite within a transmit field of view of the first satellite;

monitoring a receiver telescope of the second satellite within a receiver field of view for the transmitted beam of the first satellite;

defining a field of uncertainty associated with the knowledge of the position of each satellite in orbit relative to the other satellite, the respective fields of uncertainty being larger than the transmit field of view of the first satellite and receiver field of view of the second satellite;

scanning the transmit beam of the first satellite in a predetermined search pattern across the field of uncertainty of the first satellite;

scanning the receiver field of view of the second satellite in a predetermined search pattern across the field of uncertainty of said second satellite for said transmitted beam of said first satellite;

detecting the transmitted beam of the first satellite by the second satellite; and transmitting a second beam of coherent energy from the second satellite toward the detected beam of the first satellite until the transmitted beam of the second satellite is detected by the first satellite thereby establishing mutual acquisition between the first and second satellites.

2. The method of claim 1 further comprising the steps of:

narrowing the respective transmitted beams of the first and second satellites and calculating the differences between the directional parameters of the respective detected beams and the respective transmitted beams and generating an error signal indicative of the differences, and updating the direction of the respective transmitted beams in accordance with the error signal until the first and second satellites are linked with an operational beam width.

3. The method of claim 1 wherein the step of estimating includes receiving position data from a global positioning satellite position sensor.

4. The method of claim 1 wherein the step of estimating includes receiving the respective satellite ephemerides and an attitude of the respective satellite with respect to a reference frame.

5. A method of optically crosslinking a plurality of unlinked satellites comprising the steps of:

transmitting a beam of coherent energy from each of the plurality of satellites within a respective transmit field of view;

defining a respective field of uncertainty for each of the plurality of satellites said field of uncertainty being larger than said respective field of view;

scanning the respective beams of the plurality of satellites across said respective fields of uncertainty until at least two satellites illuminate each other and thereby crosslink, and thereafter scanning the respective beams of the plurality of satellites across the respective fields of uncertainty until each of the plurality of satellites is crosslinked with at least one other of the plurality of satellites.

6. The method of claim 5 wherein a first second and third satellite are provided and wherein the satellites occupy the same orbit plane and the lines from the second satellite to the first and third satellites are approximately 20 degrees below horizontal with respect to the second satellite.

7. The method of claim 6 wherein each of the satellites further includes an attitude sensor having a field of view, the sensor field of view being axially aligned along local horizontal with respect to each satellite and coplanar with the orbit plane.

* * * * *